(No Model.)　　　　　　　　　　　　　　　　　　　2 Sheets—Sheet 1.
E. PRIDMORE.
DISK HARROW.
No. 503,773.　　　　　　　　　　　　　Patented Aug. 22, 1893.
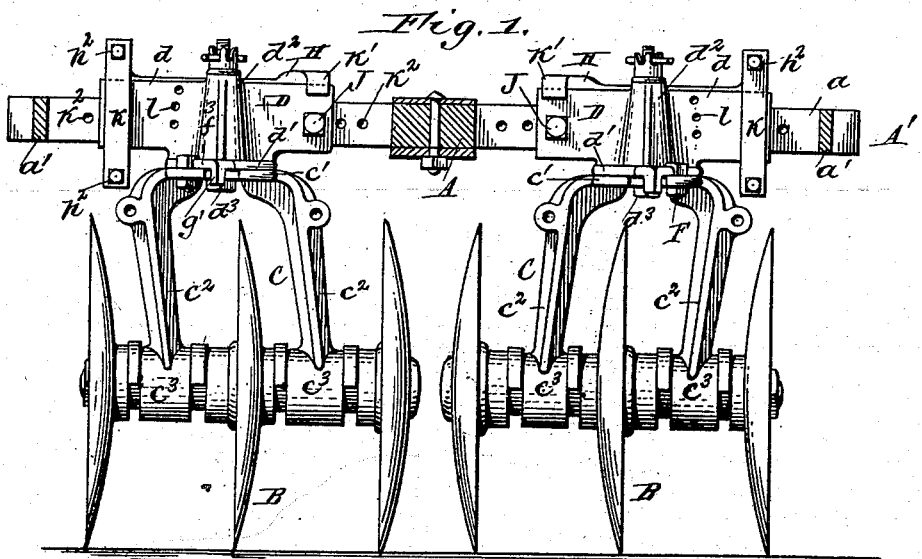
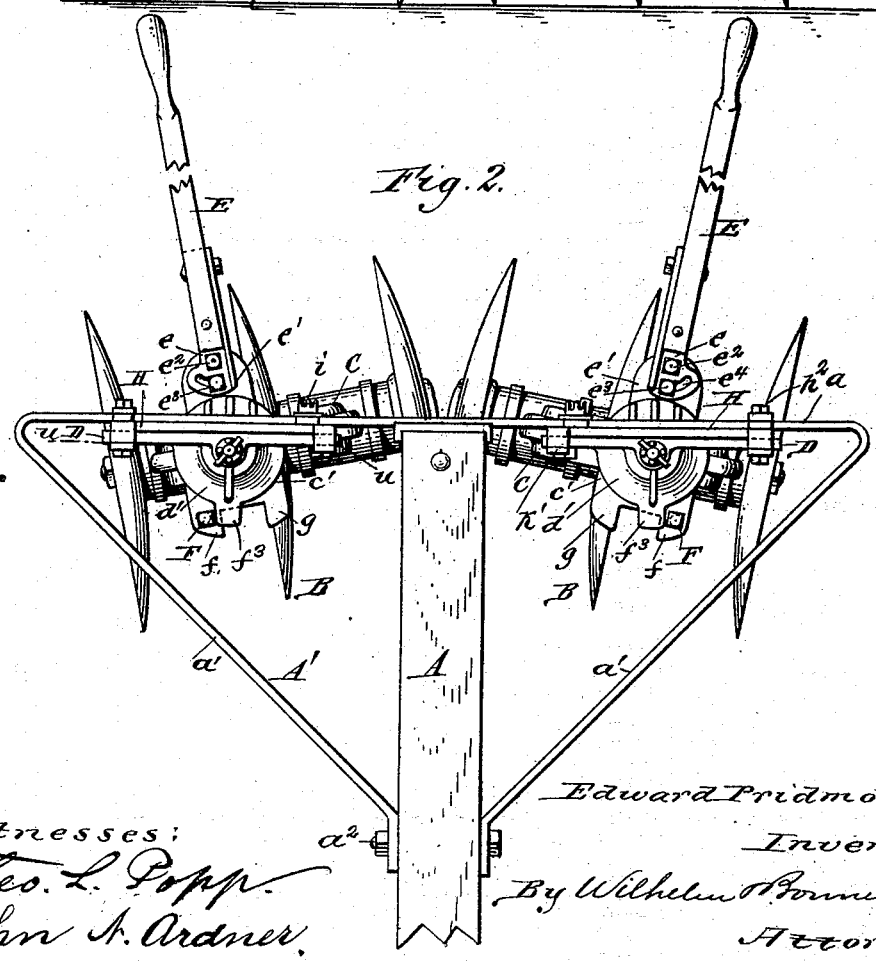
Witnesses:
Theo. L. Popp.
John N. Ardner.
Edward Pridmore,
Inventor.
By Wilhelm Bonner
Attorneys.

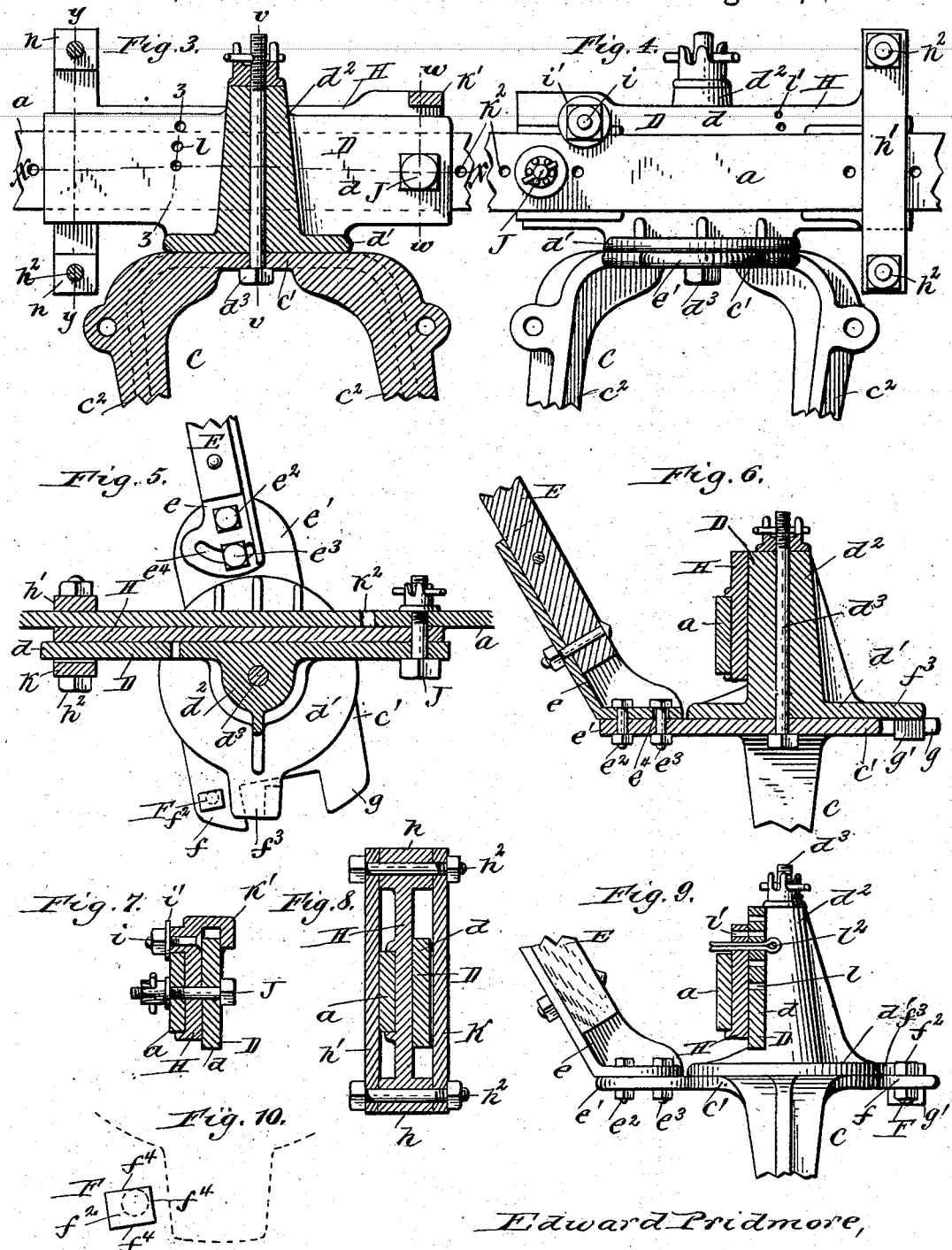

UNITED STATES PATENT OFFICE.

EDWARD PRIDMORE, OF BATAVIA, NEW YORK, ASSIGNOR TO THE JOHNSTON HARVESTER COMPANY, OF SAME PLACE.

DISK HARROW.

SPECIFICATION forming part of Letters Patent No. 503,773, dated August 22, 1893.

Application filed November 2, 1891. Serial No. 410,629. (No model.)

*To all whom it may concern:*

Be it known that I, EDWARD PRIDMORE, a citizen of the United States, residing at Batavia, in the county of Genesee and State of New York, have invented new and useful Improvements in Disk Harrows, of which the following is a specification.

This invention relates to a harrow having two gangs of concavo-convex disks which are connected to the main supporting frame in such manner as to be capable of both horizontal and vertical rocking movement thereon.

The objects of my invention are to produce a harrow in which the angle of each disk gang can be readily changed by the operator walking behind the harrow, so that the operator can thereby easily control the movements of the harrow and cause the same to follow an irregular line of plants, for instance in cultivating in vineyards; also to improve the construction of the main frame and the swiveling connection between the latter and the gangs; also to improve the device for adjusting the horizontal rocking movement of the gangs and to hold the latter rigidly against vertical movement when desired.

In the accompanying drawings consisting of two sheets, Figure 1 is a front elevation partly in section, of my improved harrow. Fig. 2 is a top plan view thereof. Fig. 3 is a fragmentary transverse section, on an enlarged scale, of one of the carrier plates and connecting parts in line $u-u$, Fig. 2. Fig. 4 is a fragmentary rear elevation of the same. Fig. 5 is a horizontal section in line $x-x$, Fig. 3. Figs. 6, 7, 8 and 9 are vertical sections in lines $v-v$, $w-w$, $y-y$ and $z-z$, Fig 3 respectively. Fig. 10 is a top view of the adjustable stop whereby the horizontal swinging movement of the disk gang is limited in one direction.

Like letters of reference refer to like parts in the several views.

A represents the draft pole and A' a triangular supporting frame preferably made of iron or steel and secured to the rear portion of the draft pole. This supporting frame consists of a horizontal cross bar $a$ which is secured centrally to the rear end of the pole, and two forwardly inclined braces $a'$ $a'$ made integrally with the cross bar and extending inwardly from the outer ends of the cross piece and secured with their front ends to the pole by a bolt $a^2$. This forms a very simple, rigid and durable support for the working parts of the harrow.

B B represent two disk gangs which are arranged underneath the cross piece of the supporting frame.

C C represent yokes whereby the disk gangs are supported. Each of these yokes consists of a horizontal pivot plate $c'$ provided on opposite sides with depending arms $c^2$ which latter have bearings $c^3$ at their lower ends in which the disk gangs are journaled.

D represents brackets whereby the yokes of the disk gangs are supported and which are arranged in front of the cross bar $a$. Each of these brackets consists of a vertical plate $d$, a horizontal pivot plate $d'$ formed at the lower end of the vertical plate, and a vertical boss $d^2$ extending upwardly from the horizontal plate on the front side of the vertical plate. The yoke of each disk gang is pivoted to the bracket by a bolt $d^3$ passing vertically through the boss $d^2$ and the horizontal pivot plate, thereby permitting the disk gang to turn or swivel horizontally.

E E represent inclined handles attached to the rear portions of the yokes, whereby the angle of the disk gangs is adjusted with reference to the line of draft. Each of these handles is provided at its lower end with a foot $e$, which rests upon a horizontal lug $e'$ formed on the rear side of the yoke. The foot $e$ is pivoted to the lug by a bolt $e^2$.

$e^3$ represents a fastening bolt passing through the lug $e'$ and a segmental slot $e^4$ formed in the foot $e$, which in connection with the pivotal attachment permits of adjusting the horizontal position of the handles with reference to the yoke.

F F represent adjustable stops whereby the outward throw of the disk gangs is regulated. Each of these stops consists of a bolt arranged vertically in a lug $f$ formed on the front side of the yoke. This stop moves with the yoke in adjusting the angle of the gang and is provided with a head $f^2$ on its upper end which strikes against one side of an arm $f^3$ formed on the front side of the bracket, when the yoke has reached the limit of its movement.

The upper head of this stop bolt is provided with a number of flat vertical sides $f^4$ which are arranged at different distances from the center of the bolt, as represented in Fig. 10, so that upon turning the bolt in the lug $f$ and tightening the same the distance which the stop bolt travels before striking the arm $f^3$ can be regulated, thereby adjusting the movement of the disk gangs in one direction. The movement of the disk gangs in the opposite direction is limited by a forwardly extending lug $g$ formed on each yoke and adapted to strike against depending ears $g'$ formed on one side of each of the arms $f^3$.

H H represent carrier plates whereby the brackets are movably supported. These carrier plates are arranged vertically against the front side of the cross piece and provided with perforated bosses $h$ at the upper and lower sides of the plates at the outer ends thereof.

$h'$ represents clamping bars arranged vertically against the rear side of the cross piece and secured to the carrier plates by bolts $h^2$ passing through said bars and the perforated bosses $h$ of the carrier plates, whereby the latter are clamped upon the cross piece. The inner ends of the carrier plates are preferably clamped to the cross piece by means of clamping bolts $i$ passing through the carrier plates and provided on their rear ends with washers $i'$ which bear against the rear side of the cross piece, as represented in Figs. 2, 4 and 7.

J J represent bolts passing horizontally through the inner ends of the brackets, the carrier plates and the cross piece, whereby the brackets are pivotally secured to the harrow frame, thereby permitting the disk gangs to oscillate vertically for the purpose of adjusting themselves to the inequalities of the ground. The outer ends of the brackets are guided in their vertical movements by vertical bars $k$ which are arranged in front of the brackets and secured to the perforated bosses $h$ by the bolts $h^2$.

$k'$ represents hooks formed on the upper sides of the carrier plates and overlapping the inner portions of the brackets adjacent to the pivot bolts J, thereby assisting the latter in retaining the inner ends of the brackets in place and relieving the strain applied to them by the thrusts of the disks.

The cross piece is provided with a series of openings $k^2$ for each pivot bolt J which permits the disk gangs to be adjusted laterally in the frame for the purpose of increasing or reducing the width of the harrow.

$l$ represents a series of horizontal openings formed in each bracket and adapted to register with openings $l'$ formed in each of the carrier plates. If desired, the disk gangs may be held rigidly by passing spring pins $l^2$ through the openings of the brackets and the carrier plates, as represented in Fig. 9, thereby preventing the disk gangs from rocking vertically. By passing the pins $l^2$ through one of the higher openings in the brackets, the disk gangs may be held in an inclined position.

As represented in Figs. 1 and 2, the concave sides of the disks face outwardly, which effects an outward throw of the soil. Upon removing the pivot bolts J, the rear clamping bars $h'$ and the clamping bolts $i$, the disk gangs can be transposed or interchanged in the usual manner, so that the concave sides of the disks face inwardly and the soil is thrown inwardly.

In using the harrow, the operator can readily incline both or only one of the disk gangs by means of the handles according to the varying conditions of the work. When the disk gangs are straight or when both gangs are inclined at the same angle, the harrow will travel straight ahead. But if one gang is straight and the other inclined, or one is inclined more than the other, the harrow will travel obliquely toward the side of the gang having the least inclination. By this means the operator has perfect control of the harrow and can readily direct the movements of the harrow, as the nature of the work may demand. The gangs are perfectly free to be swung on their pivots excepting that the stops mark the position in which the disks have the desired angle. This enables the operator to move each gang freely on its pivot, and independently of the other gang, as may be necessary for the purpose of guiding the harrow in following a crooked row, and to return each gang to its proper angle without any effort. When the disks are arranged with their concave sides outwardly the tendency of the gangs is to cut deepest at their outer ends. In this position of the gangs the horizontal pivots J are arranged on the inner sides of the vertical pivots of the gangs and throw the weight of the frame, which may be loaded, upon the inner ends of the gangs. This causes the harrow to run lighter and counteracts the tendency to cut deepest at the outer ends. When the gangs are reversed or transposed the tendency is to cut deepest at the inner ends and this is counteracted by the weight of the frame which is now thrown upon the outer ends of the gangs because the horizontal pivots are now arranged on the outer sides of the vertical pivots. By arranging the horizontal pivots at a proper distance from the vertical pivots, the gangs can be practically balanced.

I claim as my invention—

1. The combination with the harrow frame, of disk gangs connected with said frame by upright pivots, handles secured to said gangs and projecting rearwardly therefrom, and stops whereby one angular position of each gang is marked, while the gangs are otherwise free to be turned on their pivots by means of the handles, substantially as set forth.

2. The combination with the harrow frame, of yokes connected with said frame by vertical pivots, disk gangs journaled in said yokes, rearwardly extending handles which are pivoted to said yokes, and whereby the position of the handles with reference to the disk gangs can be adjusted, and means whereby the handles can be secured in their adjusted positions, substantially as set forth.

3. The combination with the harrow frame, of a pivoted yoke, a disk gang journaled in said yoke, and a movable stop provided with different faces whereby the turning movement of the yoke can be arrested at different points, substantially as set forth.

4. The combination with the harrow frame provided with a bracket, of a yoke pivoted to said bracket, a disk gang journaled in said yoke, and a revoluble stop arranged on said yoke and adapted to engage against said bracket, substantially as set forth.

5. The combination with the harrow frame provided with a bracket, of a yoke pivoted to said bracket, a disk gang journaled to said yoke, a revoluble stop arranged on said yoke and provided with flat sides arranged at different distances from the center of the stop and adapted to strike against the bracket, substantially as set forth.

6. The combination with the harrow frame and a bracket attached to said frame and provided with an arm or yoke pivoted to said bracket and provided with lugs on opposite sides, a bolt journaled in one of said lugs and having an irregular sided head adapted to strike one side of said arm, an ear formed on said arm and adapted to strike against the opposite lug, and a disk gang journaled on said yoke, substantially as set forth.

7. The combination with the harrow frame, of gangs of concavo-convex disks, transverse brackets to which said gangs are attached, and longitudinal pivots connecting said brackets with the harrow frame and arranged over the convex ends of the gangs, whereby the weight of the frame and load is applied to the convex ends of the gangs, substantially as set forth.

8. The combination with the harrow frame and the disk gang, of a carrier plate secured to said frame and provided with a vertical series of openings, a movable bracket provided with a corresponding opening, and guided with one end upon said plate, a horizontal pivot bolt passing through the bracket and the carrier plate and frame, a fastening pin passing through the corresponding openings of the bracket and carrier plate, and a yoke connected with said bracket by a vertical bolt and provided with journals for the disk gang, substantially as set forth.

9. The combination with the harrow frame and the disk gang, of a carrier plate arranged in front of said frame and provided at one end with bosses, a bar arranged in rear of said frame and secured to said bosses, a clamping bolt arranged in the opposite end of said carrier plate and bearing against said frame, a bracket guided upon one end of the carrier plate by a bar secured to said bosses, a horizontal bolt pivotally attaching the opposite end of the bracket to the carrier and said frame, a hook formed on the carrier plate and overhanging the bracket, and a yoke pivoted to said bracket by a vertical bolt and provided with journals for said disk gang, substantially as set forth.

Witness my hand this 29th day of September, 1891.

EDWARD PRIDMORE.

Witnesses:
ALBERT J. GLASS,
E. J. MOCKFORD.